United States Patent
Schelten

(10) Patent No.: US 6,668,033 B1
(45) Date of Patent: Dec. 23, 2003

(54) METHOD FOR ANALYZING A PRIMARY NEUTRON BEAM OF A NEUTRON SOURCE, A NEUTRON SOURCE HAVING A BEAM MONITOR, AND A BEAM MONITOR

(75) Inventor: Jakob Schelten, Jülich (DE)

(73) Assignee: Forschungszentrum Jülich GmbH, Jülich (DE)

( * ) Notice: Subject to any disclaimer, the term of this patent is extended or adjusted under 35 U.S.C. 154(b) by 0 days.

(21) Appl. No.: 09/480,989

(22) Filed: Jan. 11, 2000

(30) Foreign Application Priority Data

Jan. 12, 1999 (DE) ........................ 199 00 878

(51) Int. Cl.[7] ............................................. G01N 23/09
(52) U.S. Cl. .................... 376/159; 376/156; 376/158; 376/191; 376/192; 250/390.01
(58) Field of Search ................................. 376/156, 158, 376/159, 191, 192; 250/390.01

(56) References Cited

U.S. PATENT DOCUMENTS

| | | | | | |
|---|---|---|---|---|---|
| 2,549,176 | A | * | 4/1951 | Crumrine | 250/71 |
| 3,778,627 | A | * | 12/1973 | Carpenter | 376/192 |
| 3,794,843 | A | * | 2/1974 | Chen | 250/359 |
| 3,889,112 | A | * | 6/1975 | Holmes et al. | 250/265 |
| 3,993,910 | A | * | 11/1976 | Parkin et al. | 376/108 |
| 4,309,249 | A | * | 1/1982 | Steinberg et al. | 376/192 |
| 4,487,738 | A | * | 12/1984 | O'Brien et al. | 376/192 |
| 4,575,634 | A | * | 3/1986 | Redler et al. | 250/358.1 |
| 4,582,667 | A | * | 4/1986 | Bauer | 376/192 |
| 4,645,635 | A | * | 2/1987 | Yuen et al. | 376/245 |
| 4,646,068 | A | * | 2/1987 | Skala | 340/580 |
| 4,837,442 | A | * | 6/1989 | Manglos | 250/390.01 |
| 4,864,142 | A | * | 9/1989 | Gomberg | |
| 4,918,315 | A | * | 4/1990 | Gomberg et al. | |
| 5,078,952 | A | * | 1/1992 | Gozani et al. | 376/159 |
| 5,098,640 | A | * | 3/1992 | Gozani et al. | 376/166 |
| 5,142,153 | A | | 8/1992 | Gomberg | 250/390.04 |
| 5,278,418 | A | * | 1/1994 | Broadhurst | 250/390.04 |
| 5,298,756 | A | * | 3/1994 | McCollum et al. | 250/390.07 |
| 5,433,693 | A | * | 7/1995 | Ott | 600/1 |
| 5,440,136 | A | | 8/1995 | Gomberg | 250/390.04 |
| 5,489,781 | A | | 2/1996 | Mohr et al. | 250/385.1 |
| 5,553,105 | A | * | 9/1996 | Xiao | 376/159 |
| 5,600,700 | A | * | 2/1997 | Krug et al. | 378/57 |
| 5,606,167 | A | * | 2/1997 | Miller | |
| 6,269,142 | B1 | * | 7/2001 | Smith | |
| 6,345,080 | B1 | * | 2/2002 | Bauer et al. | 376/159 |
| 6,393,085 | B1 | * | 5/2002 | Heller et al. | 376/158 |

OTHER PUBLICATIONS

Nordell et al "Angular distribution and yield from bremsstrahlung targets", Pys. Med. Biol. 1984, Vol 29, No 7, pp 797–810.*

Grodzins, " Nuclear and X–ray technologies for airport security", MIT Apr. 17, 1990pp 1 to 28.*

* cited by examiner

Primary Examiner—Michael J. Carone
Assistant Examiner—John Richardson
(74) Attorney, Agent, or Firm—Kubovcik & Kubovcik

(57) ABSTRACT

Method for analyzing a primary neutron beam of a neutron source, a neutron source having a beam monitor, and a beam monitor. Fission chambers which are arranged in the primary neutron beam are known as beam monitors. Fission processes initiated by the neutrons produce in the fission chambers free charge carriers which, given an applied electric voltage, effect an ionization current pulse by means of which the neutron is counted. Produced as by-product during fission are undesired fast neutrons and high-energy gamma radiation. In addition, the flux of slow neutrons can be substantially attenuated by the gas filling of the fission chambers. These disadvantages can be avoided in the case of the novel method, the novel neutron source and the novel beam monitor. Neutrons are scattered incoherently out of the primary neutron beam (1) by means of a scattering foil (4). A portion of the scattered neutrons (5) strike a detector device (6) which is arranged outside the primary neutron beam (1). The beam monitor (2) can be constructed straight away such that the spatial distribution and, in the case of pulsed neutron sources, the spectral distribution of the neutrons in the primary neutron beam (1) can be determined. Analysis of a primary neutron beam of a neutron source, in particular a pulsed spallation neutron source.

8 Claims, 1 Drawing Sheet

Figure 1:
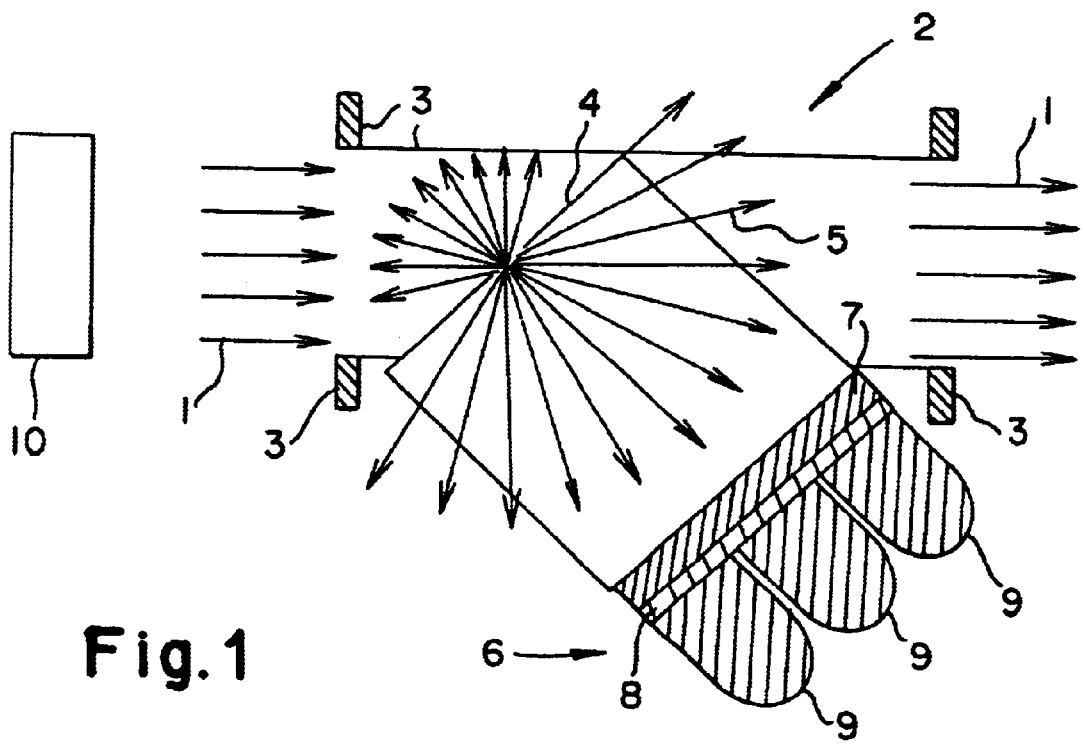

METHOD FOR ANALYZING A PRIMARY NEUTRON BEAM OF A NEUTRON SOURCE, A NEUTRON SOURCE HAVING A BEAM MONITOR, AND A BEAM MONITOR

DESCRIPTION

The invention relates to a method for analyzing a primary neutron beam of a neutron source, a neutron source having a beam monitor, and a beam monitor for neutron beams.

It is known to use fission chambers as beam monitors for the purpose of analyzing the primary neutron beam of a neutron source. Such fission chambers have on their inner walls a thin layer of $^{235}$U-containing material which serves as neutron absorber. Neutrons captured by $^{235}$U cause thermal fission in which the desired fission products produce electrons and ions in a gas located in the fission chamber. Because of an applied electric voltage, these mobile charge carriers effect an ionization current pulse with the aid of which the neutron producing the fission is counted.

A disadvantage of the fission chambers is that in addition to the desired fission products three fast MeV neutrons on average and MeV gamma radiation are produced during thermal fission. This high-energy neutron and/or gamma radiation is undesired as a rule in the case of neutron sources.

Also disadvantageous is that the flux of slow neutrons through the fission chamber can be substantially attenuated, since the neutron absorption is inversely proportional to the speed of the neutrons.

It is the object of the present invention to make available a method, a neutron source and a beam monitor of the type mentioned at the beginning which do not have the abovementioned disadvantages.

In the case of a method of the type mentioned at the beginning, this object is achieved by virtue of the fact that a portion of the neutrons are scattered out of the primary neutron beam by means of a scattering unit which scatters neutrons at least predominantly incoherently, and a portion of the neutrons which can be defined via the scattering behaviour of the scattering unit and the geometrical conditions are fed to a detector device arranged outside the primary neutron beam. This prevents the primary neutron beam from being disturbed by a detecting operation required for analyzing this neutron beam. The primary neutron beam can be screened effectively from radiation possibly produced in the detector device. The incoherent scattering of the neutrons from the primary neutron beam can be selected such that the primary neutron beam is attenuated only insubstantially. Thus, for example, the fraction of the scattered neutrons in the total number of the neutrons in the primary neutron beam can be fixed at values of between $10^{-2}$ and $10^{-6}$.

The method according to the invention can also be designed such that the neutrons in the detector device are guided through a collimator unit with the result that only neutrons essentially parallel in their direction of movement are detected in a detecting unit arranged downstream of the collimator unit in the direction of movement of the neutrons, and that the impingement of the neutrons is determined in a spatially resolved fashion in the detecting unit.

If only such neutrons as have essentially parallel directions of movement are detected in the detecting unit, the spatially resolved detection of the neutrons in the detecting unit can be used to gain information on the spatial distribution of the neutrons in the scattering unit and thus in the primary neutron beam. An essentially parallel direction of movement means that the direction of movement of the detected neutrons deviates from the collimator axis at most by an acceptance angle prescribed by the design of the collimator. The acceptance angle can be determined, for example, depending on the required spatial resolution at values of between $10^{-1}$ and $10^{-2}$ radians.

The method according to the invention can be designed such that in the case of a pulsed neutron source the instants of the detection of the neutrons in the detector device are determined, and time of flight spectra are prepared with reference to the instant of the production of the neutrons. A time-resolved analysis of the primary neutron beam is thereby also rendered possible.

With regard to a neutron source having a beam monitor for investigating a primary neutron beam produced in the neutron source, the beam monitor comprising a detector device for detecting neutrons, the abovenamed object is achieved by virtue of the fact that the beam monitor has a scattering unit arranged in the beam path of the primary neutron beam and scattering neutrons at least predominantly incoherently, and in that the detector device is arranged outside the beam path of the primary neutron beam and provided for the purpose of analyzing a portion of the neutrons scattered by the scattering unit.

It can be advantageous to construct the neutron source according to the invention such that the detector device comprises a) a collimator unit which allows the passage only of neutrons with a direction of movement essentially parallel to the collimator axis, b) a detecting unit arranged downstream of the collimator unit seen in the direction of movement of the scattered neutrons and suitable for detecting impinging neutrons, and c) means for determining the spatial distribution of the neutrons detected by the detecting unit.

The neutron source according to the invention can also be constructed such that the detecting unit is a scintillator, and in that for the purpose of detecting the spatial distribution of the detected neutrons at least one spatially resolving photomultiplier is provided downstream of the scintillator seen in the direction of movement of the neutrons impinging on the scintillator, or a plurality of photomultipliers are arranged in an array parallel to the side of, the scintillator facing the scattering unit. The scintillator can be selected to be so thick that all the neutrons within the wavelength band of 0.01 to 1 nm are absorbed up to at least 70%. The absorbed neutrons produce a light pulse which can be evaluated by the photomultiplier or photomultipliers. In the case of an arrangement of non-spatially resolving photomultipliers in the form of an array, each individual detection event is assigned to the photomultiplier with the aid of which the strongest pulse is determined, thus securing the spatial resolution which becomes better the more photomultipliers are used for detecting. Alternatively, it is also possible to make use of a spatially resolving photomultiplier. A spatially resolving photomultiplier is already enough to permit a spatial resolution of the neutron detection on the region of the scintillator it is monitoring.

The neutron source according to the invention can also be constructed such that the scattering unit is a two-dimensional foil, the collimator axis is perpendicular to the scattering foil, and the surface of the detecting unit facing the scattering foil is parallel to the scattering foil. Since the surface of the detecting unit on which the neutrons impinge is thus parallel to the scattering foil, and the detected neutrons have essentially parallel directions of movement, the path length of these neutrons between the scattering foil and detecting unit is essentially the same, that is to say independent of the location of the scattering and/or of the location of the detection, for which reason the spatial sensitivity of the beam monitor is not disturbed by different path lengths.

However, the neutron source according to the invention can also be constructed such that the collimator axis is perpendicular to the direction of movement of the neutrons in the primary beam path, and the surface of the detecting unit facing the scattering foil is perpendicular to the collimator axis. In this arrangement, it is not possible to achieve parallelism between the scattering foil and the surface of the detecting unit facing the scattering foil, that is to say the distance between the detecting unit and scattering foil varies. However, since this variation is time-stable, it can be corrected computationally. Since in the case of this arrangement the direction of movement of the neutrons to be detected in the detecting unit is perpendicular to the course of the primary beam path, the length of the beam monitor seen in the direction of the primary neutron beam can be minimized. It is also possible as a further alternative in the case of a collimator axis aligned perpendicular to the course of the primary neutron beam to arrange the detecting unit and the scattering foil parallel to one another. In this case, the collimator axis is not aligned at right angles to the two-dimensional extent of the collimator or to the impingement surface of the detecting unit.

Finally, the neutron source according to the invention can be constructed such that the neutron source is a pulsed spallation neutron source. In the case of pulsed spallation neutron sources, in particular, a spectral and spatial analysis of the primary neutron beam is desired.

In the case of a beam monitor for neutron beams which comprises a detector device suitable for detecting neutrons, the abovenamed object is achieved by a scattering unit which scatters neutrons at least predominantly incoherently. Incoherent scattering can, for example, be produced by scattering foils made from vanadium, polyethylene or from a titanium isotope mixture which exhibit only slight Bragg reflection or none.

Finally, the beam monitor according to the invention can also be constructed such that the detector device comprises
a) a collimator unit which allows the passage only of neutrons with a direction of movement essentially parallel to the collimator axis,
b) a detecting unit arranged downstream of the collimator unit seen in the direction of movement of the penetrating neutrons and suitable for detecting impinging neutrons, and
c) means for determining the spatial distribution of the neutrons detected by the detecting unit.

Figure 2:
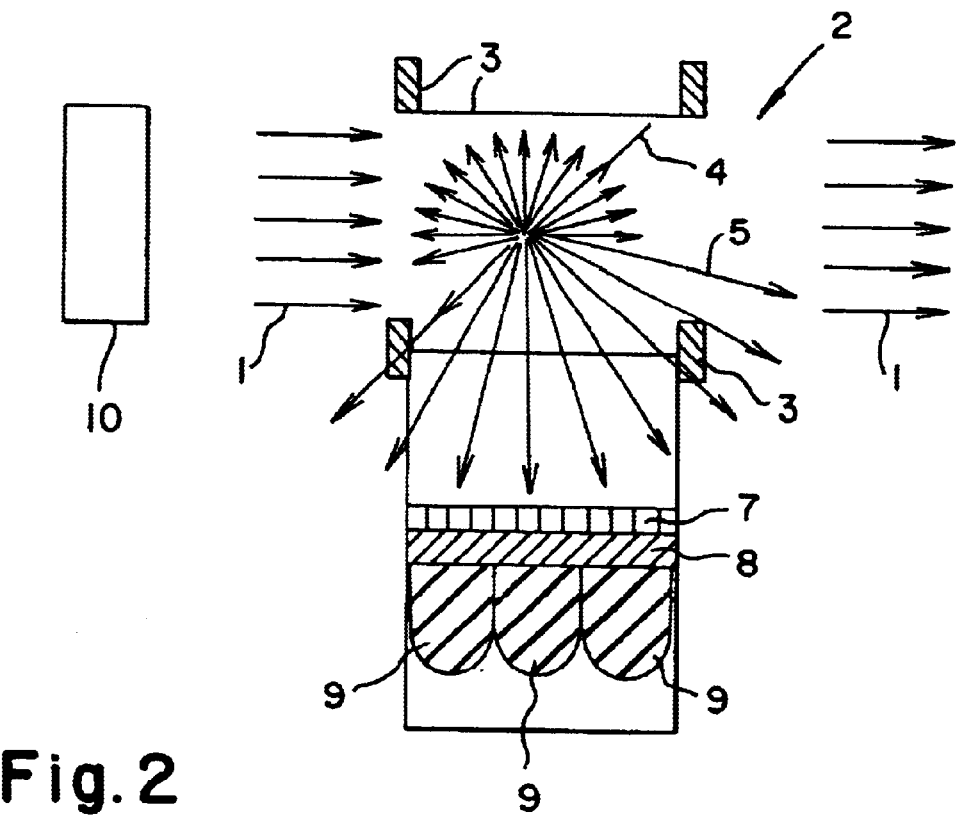

Advantageous embodiments and refinements of the method according to the invention or of the neutron source according to the invention and the beam monitor according to the invention are represented below with the aid of two figures, in which:

FIG. 1 is a representation of a neutron source showing parts of a beam monitor in the primary beam path of the neutron source, and FIG. 2 is a representation of a neutron source showing parts of a beam monitor with a geometry altered from FIG. 1.

Arrows in FIG. 1 and FIG. 2 indicate a primary neutron beam 1 emitted by a primary neutron beam source 10 of a neutron source (not represented in its entirety). The primary neutron beam 1 strikes a beam monitor 2 whose housing 3 is only indicated in the figures. In the beam monitor 2, the primary neutron beam 1 strikes a scattering foil 4 made from vanadium, polyethylene or a titanium isotope mixture which scatter the thermal neutrons of the neutron beam 1 essentially only incoherently, that is to say without Bragg reflection. Because of the chiefly incoherent scattering, the scattered neutrons 5, which are likewise indicated here by arrows, are emitted isotropically into space. The fraction of the incoherently scattered neutrons 5 with reference to the total neutron number in the primary neutron beam 1 is, for example, $5 \times 10^{-3}$ in case of a vanadium foil with a thickness of 0.1 mm.

Beam attenuation and the fraction of scattered neutrons for three wavelengths and four thicknesses of foils made from the abovenamed materials are reproduced below in three tables for the case in which the foils are attached at an angle of 45° to the path of the primary neutron beam 1. The variables given in the tables are:

$V_c$: volume of the elementary cell of the material used,
$b^{coh}$: coherent scattering length,
$\sigma^{coh}$, $\sigma^{inc}$: effective cross sections for coherent or incoherent scattering,
$\Sigma^{inc} = \sigma^{inc}/V_c$, $\mu^{abs}$: absorption coefficient and $\lambda$: wavelength.

TABLE 1

VANADIUM FOILS $V_c = 14.14 \ 10^{-24} \ cm^3$  $\sigma^{coh} = 0.033$ barn
$b^{coh} = -0.051 \ 10^{-12} \ cm$  $\sigma^{inc} = 5.07$ barn
$\mu^{abs}$ (0.1 nm) = 0.185 cm$^{-1}$  $\Sigma^{inc} = 0.359$ cm$^{-1}$  $\sigma^{coh}/\sigma^{inc} = 0.6\%$

| Foil thickness | 0.001 mm | 0.01 mm | .1 mm | 1 mm |
|---|---|---|---|---|
| Beam attenuation by absorption for | | | | |
| $\lambda$ = 0.01 nm | 1–2.6 10$^{-6}$ | 1–2.6 10$^{-5}$ | 1–2.6 10$^{-4}$ | 0.9974 |
| $\lambda$ = 0.1 nm | 1–3.6 10$^{-5}$ | 1–2.6 10$^{-4}$ | 0.9974 | 0.974 |
| $\lambda$ = 1.0 nm | 1–2.6 10$^{-4}$ | 1–2.6 10$^{-3}$ | 0.974 | 0.74 |
| Fraction of incoherently scattered neutrons S | 5.0 10$^{-5}$ | 5.0 10$^{-4}$ | 5.0 10$^{-3}$ | 0.050 |

TABLE 2

POLYETHYLENE FOILS $V(CH_2) = 25.8 \ 10^{-24} \ cm^3$  $\sigma^{coh} = 0.11$ barn
$b^{coh} = -0.095 \ 10^{-12} \ cm$  $\sigma^{inc} = 160$ barn
$\mu$(0.1 nm = 0.007 cm$^{-1}$  $\Sigma^{inc} = 6.2$ cm$^{-1}$  $\sigma^{coh}/\sigma^{inc} = 0.06\%$

| Foil thickness | 0.001 mm | 0.01 mm | 0.1 mm | 1 mm |
|---|---|---|---|---|
| Beam attenuation by absorption for | | | | |
| $\lambda$ = 0.01 nm | 1-1 10$^{-7}$ | 1-1 10$^{-6}$ | 1-1 10$^{-5}$ | 1-1 10$^{-4}$ |
| $\lambda$ = 0.1 nm | 1-1 10$^{-6}$ | 1-1 10$^{-5}$ | 1-1 10$^{-4}$ | 1-1 10$^{-3}$ |
| $\lambda$ = 1.0 nm | 1-1 10$^{-5}$ | 1-1 10$^{-4}$ | 1-1 10$^{-3}$ | 1-1 10$^{-2}$ |
| Fraction of incoherently scattered neutrons S | 0.00087 | 0.0087 | 0.087 | 0.87 |

TABLE 3

TITANIUM ISOTOPE MIXTURE with $^{48}$Ti and $^{50}$Ti
with coherent scattering lengths −0.58 10$^{-12}$ and 0.55 10$^{-12}$
relative fractions 48.7% and 51.3%
with nuclear spin 0 and 0
with absorption cross sections σ(0.1 mm) 4.29 barn and 0.10 barn

| | | | | |
|---|---|---|---|---|
| $V_c$ = 18.9 10$^{-24}$ cm$^3$ | $\sigma^{coh}$ = 0.00 barn | | | |
| $b^{coh}$ = −0.00 10$^{-12}$ cm | $\sigma^{inc}$ = 4.01 barn | | | |
| $\mu$(0.1 nm) = 0.116 cm$^{-1}$ | $\Sigma^{inc}$ = 0.21 cm$^{-1}$ | $\sigma^{coh}/\sigma^{inc}$ = 0.0% | | |
| Foil thickness | 0.001 mm | 0.01 mm | 0.1 mm | 1 mm |
| Beam attenuation by absorption for | | | | |
| $\lambda$ = 0.01 nm | 1.6 10$^{-6}$ | 1.6 10$^{-5}$ | 1.6 10$^{-4}$ | 1.6 10$^{-3}$ |
| $\lambda$ = 0.1 nm | 1.6 10$^{-5}$ | 1.6 10$^{-4}$ | 1.6 10$^{-3}$ | 1.6 10$^{-2}$ |
| $\lambda$ = 1.0 nm | 1.6 10$^{-4}$ | 1.6 10$^{-3}$ | 1.6 10$^{-2}$ | 1.6 10$^{-1}$ |
| Fraction of incoherently scattered neutrons S | 2.9 10$^{-5}$ | 2.9 10$^{-4}$ | 0.0029 | 0.029 |

In the case of scattering foils 4 made from vanadium or titanium, the incoherent scattering contribution can be further substantially raised by interstitially dissolved hydrogen.

A detector device 6 belonging to the beam monitor 2 is arranged outside the primary neutron beam 1. The detector device 6 is assembled from a Soller slit-typed collimator 7, a scintillator 8 and a plurality of photomultipliers 9 which are arranged in an array downstream of the scintillator 8 in the direction of movement of the scattered neutrons 5. Scattered neutrons 5 impinging on the scintillator 8 in each case produce in the scintillator 8 a flash of light which can be recorded with the aid of the photomultipliers. The neutron thereby detected is assigned to the region of the scintillator 8 which is situated upstream of the photomultiplier 9 which has supplied the strongest signal. It is thereby possible to determine a spatial distribution of the detected neutrons in the scintillator 8.

The collimator 7 has the effect that the scattered neutrons 5 reaching the sciritillator 8 are only those whose direction of movement deviates from the axis of the collimator 7 by at most an acceptance angle. The acceptance angle is fixed to values of between 10$^{-1}$ and 10$^{-2}$ radians as a function of the spatial resolution required. Consequently $N_{Sz}$ neutrons strike the scintillator 8 in a period t, $N_{Sz}$ being given by $$N_{Sz} = \Phi_n F t s [\alpha^2/4\pi].$$

In this equation, $\Phi_n$ is the primary neutron flux, F is its cross-sectional area and t is the integration time. The fraction of neutrons which reach the scintillator is therefore $$N_{Sz}/\Phi_n F t = s[\alpha^2/4\pi] = 10^{-3} \ldots 10^{-11}.$$

The scintillator 8 is a commercially available $^6$Li glass scintillator with a thickness of 10 mm. In the case of this thickness, the impinging neutrons are absorbed within the wavelength band of 0.01 nm to 1 nm up to at least 70% for the production of a light pulse which can be utilized. A uniform spectral sensitivity can be ensured with the aid of such a large absorbtivity.

The spectral distribution of the neutrons in the primary neutron beam 1 can be determined by a time of flight measurement. A time of flight measurement requires reliable knowledge of the instant at which a neutron has been detected in the scintillator, and of when the neutron was produced in the neutron source. In the case of pulsed spallation neutron sources, the instant of production is yielded from the impingement of protons at the target of the neutron source.

In the case of a spacing of 10 m between the neutron source and the beam monitor, the spectral resolution $\delta\lambda/\lambda$ is approximately 4×10$^{-4}$ for the mean wavelength of $\lambda$=0.1 nm. Since the total length from the neutron source up to the scintillator 8 differs slightly as a function of the location of the respective neutron in the beam cross section, there is a need for a small time correction so that comparable time of flight spectra are produced.

In FIG. 1, the scattering foil, collimator and scintillator are arranged parallel to one another. It can be ensured thereby that the likelihood of detection for the neutrons is independent of location in the case of a homogeneous material of the scattering foil 4, of the homogeneous collimator 7 and a homogeneous material of the scintillator 8. Moreover, the considerable parallelism of the direction of movement of the scattered neutrons 5 detected with the aid of the scintillator 8 permits the spatially resolved detection in the region of the scintillator 8 to be used to gain information on the spatial distribution of the neutrons in the primary neutron beam 1.

The scattering foil 4 and the scintillator 8 are not parallel to one another in FIG. 2. Consequently, the likelihood of detection at the scintillator 8 is admittedly no longer independent of location. However, since the dependence on location is time-stable, the sensitivity of detection can be corrected computationally straight away. The geometrical structure of the beam monitor 2 in accordance with FIG. 2 has the advantage that the length of the beam monitor 2 in the direction of the primary neutron beam 1 can be minimized. In the case of this arrangement, the detected neutrons 5 have a direction of movement which is perpendicular to that of the neutrons in the primary neutron beam 1.

List of Reference Numerals
 1 Primary neutron beam
 2 Beam monitor
 3 Housing
 4 Scattering foil
 5 Scattered neutrons
 6 Detector device
 7 Soller slit-typed collimator
 8 Scintillator
 9 Photomultiplier
 10 Primary Neutron Beam Source

What is claimed is:
 1. Neutron source comprising a primary neutron beam source (10) and a beam monitor (2) for investigating the primary neutron beam (1) produced in the neutron source, the beam monitor (2) comprising a primary neutron beam entrance, a primary neutron beam exit, a primary neutron beam path formed between said primary neutron beam entrance and said primary neutron beam exit, a detector device (6) for detecting neutrons, and a scattering unit (4) arranged in said primary neutron beam path and which scatters a known fraction within the range of 10$^{-2}$–10$^{-6}$ of the total number of the neutrons in the primary neutron beam and is arranged in the beam path of the primary neutron beam (1) for scattering neutrons at least predominantly incoherently, the detector device (6) comprising
  a) a collimator unit (7) which allows the passage only of neutrons scattered by said scattering unit (4) and having a direction of movement essentially parallel to the collimator axis, the collimator unit (7) being arranged outside of the primary neutron beam path and downstream of the scattering unit seen in the direction of movement of the scattered neutrons passing through the collimator unit (7);

b) a detecting unit (8) for detecting impinging neutrons scattered by said scattering unit (4) and passing through said collimator unit (7), the detecting unit (8) arranged downstream of the collimator unit (7) seen in the direction of movement of the neutrons passing through the collimator unit (7) and suitable for detecting impinging neutrons and c) means (9) for determining the spatial distribution of the neutrons detected by the detecting unit (8).

2. Neutron source according to claim 1, characterized in that the scattering unit (4) is a two-dimensional foil, the collimator axis is perpendicular to the scattering foil (4), and the surface of the detecting unit (8) facing the scattering foil (4) is parallel to the scattering foil (4).

3. Neutron source according to claim 1, characterized in that the primary neutron beam source is a pulsed spallation neutron source.

4. Beam monitor for neutron beams, comprising a primary neutron beam entrance, a primary neutron beam exit, a primary neutron beam oath formed between said primary neutron beam entrance and said primary neutron beam exit, a detector device (6) suitable for detecting neutrons, and a scattering unit (4) arranged in said primary neutron beam path and which scatters a known fraction within the range of $10^{-2}$–$10^{-6}$ of the total number of the neutrons in the primary neutron beam at least predominantly incoherently, the detector device (6) comprising a) a collimator unit (7) which allows the passage only of neutrons scattered by said scattering unit (4) and having a direction of movement essentially parallel to the collimator axis, the collimator unit (7) being arranged outside of the primary neutron beam path and downstream of the scattering unit seen in the direction of movement of the scattered neutrons passing through the collimator unit (7);

b) a detecting unit (8) for detecting impinging neutrons scattered by said scattering unit (4) and passing through said collimator unit (7), the detecting unit (8) arranged downstream of the collimator unit (7) seen in the direction of movement of the neutrons passing through the collimator and suitable for detecting impinging neutrons and c) means (9) for determining the spatial distribution of the neutrons detected by the detecting unit (8).

5. Beam monitor for neutron beams, comprising a primary neutron beam entrance, a primary neutron beam exit, a primary neutron beam path formed between said primary neutron beam entrance and said primary neutron beam exit, a detector device (6) suitable for detecting neutrons, and a scattering unit (4) arranged in said Primary neutron beam path and which scatters a known fraction within the range of $10^{-2}$–$10^{-6}$ of the total number of the neutrons in the primary neutron beam at least predominantly incoherently, the detector device (6) comprising a) a collimator unit (7) which allows the passage only of neutrons scattered by said scattering unit (4) and having a direction of movement essentially parallel to the collimator axis, the collimator unit (7) being arranged outside of the primary neutron beam path and downstream of the scattering unit seen in the direction of movement of the scattered neutrons passing through the collimator unit (7);

b) a detecting unit (8) for detecting impinging neutrons scattered by said scattering unit (4) and passing through said collimator unit (7), the detecting unit (8) arranged downstream of the collimator unit (7) seen in the direction of movement of the neutrons passing through the collimator and suitable for detecting impinging neutrons and comprising a scintillator, and c) means (9) for determining the spatial distribution of the neutrons detected by the detecting unit (8) and arranged downstream of the scintillator in the direction of movement of the scattered neutrons and comprising at least one spatially resolving photomultiplier or a plurality of photomultipliers arranged in an array parallel to a side of the scintillator facing the scattering unit.

6. Neutron source comprising a primary neutron beam source (10) and a beam monitor (2) for investigating the primary neutron beam (1) produced in the neutron source; the beam monitor (2) comprising a primary neutron beam entrance, a primary neutron beam exit, a primary neutron beam path formed between said primary neutron beam entrance and said primary neutron beam exit, a detector device (6) suitable for detecting neutrons, and a scattering unit (4) arranged in said primary neutron beam path and which scatters a known fraction within the range of $10^{-2}$–$10^{-6}$ of the total number of the neutrons in the primary neutron beam at least predominantly incoherently, the detector device (6) comprising a) a collimator unit (7) which allows the passage only of neutrons scattered by said scattering unit (4) and having a direction of movement essentially parallel to the collimator axis, the collimator unit (7) being arranged outside of the primary neutron beam path and downstream of the scattering unit seen in the direction of movement of the scattered neutrons passing through the collimator unit (7);

b) a detecting unit (8) for detecting impinging neutrons scattered by said scattering unit (4) and passing through said collimator unit (7), the detecting unit (8) arranged downstream of the collimator unit (7) seen in the direction of movement of the neutrons passing through the collimator unit (7) and suitable for detecting impinging neutrons and comprising a scintillator, and c) means (9) for determining the spatial distribution of the neutrons detected by the detecting unit (8) and arranged downstream of the scintillator in the direction of movement of the scattered neutrons and comprising at least one spatially resolving photomultiplier or a plurality of photomultipliers arranged in an array parallel to a side of the scintillator facing the scattering unit.

7. Neutron source according to claim 6, characterized in that the scattering unit (4) is a two-dimensional foil, the collimator axis is perpendicular to the scattering foil (4), and the surface of the detecting unit (8) facing the scattering foil (4) is parallel to the scattering foil (4).

8. Neutron source according to claim 6, characterized in that the primary neutron beam source is a pulsed spallation neutron source.

* * * * *